United States Patent
Lu et al.

(10) Patent No.: US 12,345,878 B1
(45) Date of Patent: Jul. 1, 2025

(54) MULTIMODAL PHOTONIC COMPONENTS

(71) Applicant: X Development LLC, Mountain View, CA (US)

(72) Inventors: Jesse Lu, East Palo Alto, CA (US); Brian John Adolf, San Mateo, CA (US); Martin Friedrich Schubert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 58 days.

(21) Appl. No.: 18/366,427

(22) Filed: Aug. 7, 2023

Related U.S. Application Data (63) Continuation of application No. 16/720,957, filed on Dec. 19, 2019, now Pat. No. 11,835,715.

(51) Int. Cl.
  *G02B 27/00* (2006.01)
  *G06F 30/23* (2020.01)
  *G06F 111/10* (2020.01)

(52) U.S. Cl.
  CPC ......... *G02B 27/0012* (2013.01); *G06F 30/23* (2020.01); *G06F 2111/10* (2020.01)

(58) Field of Classification Search
  CPC ................ G02B 27/0012; G06F 30/23; G06F 2111/10
  See application file for complete search history.

(56) References Cited

U.S. PATENT DOCUMENTS

| | | | |
|---|---|---|---|
| 6,356,681 B1 | 3/2002 | Chen | |
| 6,408,119 B1 | 6/2002 | Meltz et al. | |
| 6,456,762 B1 | 9/2002 | Nishiki | |
| 6,477,194 B1 | 11/2002 | Eng | |
| 6,681,067 B1 | 1/2004 | Kersey | |
| 6,768,850 B2 | 7/2004 | Dugan et al. | |
| 6,847,762 B2 | 1/2005 | Sweetser et al. | |

(Continued)

OTHER PUBLICATIONS

Udupa et al. Voxelized Topology Optimization for Fabrication-Compatible Inverse Design of 3D Photonic Devices Optics Express, vol. 27, No. Jul. 15, 2019 (Year: 2019).*

(Continued)

*Primary Examiner* — Rehana Perveen
*Assistant Examiner* — Cuong V Luu
(74) *Attorney, Agent, or Firm* — Fish & Richardson P.C.

(57) ABSTRACT

Methods, systems, and apparatus, including computer programs encoded on a computer storage medium, for designing a multimodal photonic component. In one aspect, a method includes defining a loss function within a simulation space including multiple voxels and encompassing features of the multimodal photonic component. The loss function corresponds to a target output mode profile for an input mode profile, where the target output mode profile includes a relationship between a set of operating conditions and one or more supported modes of the multimodal photonic component at a particular operative wavelength. The initial structure is defined for one or more features, where at least some of the voxels corresponding to features have a dimension smaller than a smallest operative wavelength of the multimodal photonic component, and values for structural parameters for the features are determined so that a loss according to the loss function is within a threshold loss.

18 Claims, 7 Drawing Sheets

(56) References Cited

U.S. PATENT DOCUMENTS

| | | |
|---|---|---|
| 6,946,684 B2 | 9/2005 | Shigihara |
| 6,956,994 B2 | 10/2005 | Bernard |
| 8,380,027 B2 | 2/2013 | Reed |
| 10,592,732 B1 | 3/2020 | Sather et al. |
| 11,092,746 B1 | 8/2021 | Adolf et al. |
| 11,256,841 B1 | 2/2022 | Lamant |
| 11,604,957 B1 | 3/2023 | Schubert et al. |
| 2003/0186142 A1 | 10/2003 | Deshmukh et al. |
| 2004/0028104 A1 | 2/2004 | Buda |
| 2004/0196884 A1 | 10/2004 | Ohkubo |
| 2005/0226558 A1 | 10/2005 | Kim et al. |
| 2006/0078258 A1 | 4/2006 | Anisimov et al. |
| 2008/0013581 A1 | 1/2008 | Kobayashi |
| 2008/0089374 A1 | 4/2008 | Eichler |
| 2010/0142566 A1 | 6/2010 | Liu et al. |
| 2011/0102799 A1 | 5/2011 | Matejka et al. |
| 2016/0012176 A1 | 1/2016 | Liu et al. |
| 2016/0164260 A1 | 6/2016 | Chua |
| 2017/0024356 A1 | 1/2017 | Angerer |
| 2017/0179680 A1 | 6/2017 | Mahgerefteh |
| 2018/0024297 A1 | 1/2018 | Bovington et al. |
| 2018/0045953 A1 | 2/2018 | Fan et al. |
| 2018/0053334 A1 | 2/2018 | Schneider |
| 2018/0189425 A1 | 7/2018 | Van Vaerenbergh |
| 2019/0097722 A1 | 3/2019 | McLaurin et al. |
| 2019/0179016 A1 | 6/2019 | Raring et al. |
| 2020/0050715 A1 | 2/2020 | Krishnannurthy et al. |
| 2020/0226221 A1 | 7/2020 | Lu et al. |
| 2021/0007702 A1 | 1/2021 | Lee et al. |
| 2021/0305767 A1 | 10/2021 | Schubert et al. |

OTHER PUBLICATIONS

Yin Photonic Inverse Design for 3-D Structures and Optical Phase Change Materials, Massachusetts Institute of Technology Jun. 2019 (Year: 2019).*

Bernhardi Bragg-Grating-Based Rare-Earth-Ion-Doped Channel Waveguide Lasers and Their Applications 2012 (Year: 2012).*

Andkjaer et al., "Topology-optimized broadband surface relief transmission grating, " Proc. SPIE, Physics and Simulation of Optoelectronic Devices, Mar. 7, 2014, 8980:898006-2.

Bernhardi, "Fourteen Philosophy Thesis Topic Ideas for University Students," Dissertation for the degree of Doctor University of Twente, Integrated Optical MicroSystems (IOMS) group, Faculty of Electrical Engineering, Mathematics and Computer Science, MESA+ Institute for Nanotechnology, Apr. 1982, 169 pages.

Borel et al., "Topology optimization and fabrication of photonic crystal structures," Optics Express, May 2004, 12(9):6 pages.

Boutanni et al., "Efficient pixel-by-pixel optimization of photonic devices utilizing the Dyson's equation in a Green's function formalism: Part II. Implementation using standard electromagnetic solvers," Journal of the Optical Society of America, Sep. 2019, 36(9)2387-2394.

Damask, "Integrated-Optic Grating-Based Filters For Optical Communications Systems," Thesis for the degree of Doctor of Philosophy, Massachusetts Institute of Technology, May 6, 1996, 282 pages.

Frei et al., "Topology optimization of a photonic crystal waveguide termination to maximize directional emission," Appl. Phys. Lett. 86, Mar. 2005, 86:111114.

Ghanem et al., "Information Fusion: Scaling Subspace-Driven Approaches," arXiv:2204.12035, Apr. 26, 2022, 18 pages.

Guo et al. "Study on a Recurrent Convolutional Neural Network Based FDTD Method, " 2019 International Applied Computational Electromagnetics Society Symposium—China (ACES), Oct. 31, 2022, 9 pages.

Hughes, "Adjoint-Based Optimization and Inverse Design oh Photonic Devices," Thesis for the degree of Doctor of Philosophy, Stanford University, Department of Applied Physics, Aug. 2019, 158 pages.

Ingersoll, "Multiplexed Volume Bragg Gratings in Narrowand Broadband Spectral Systems: Analysis and Application," Thesis for the degree of Philosophy, University of Minnesota, May 2015, 129 pages.

Kores et al., "Temperature Dependence of the Spectral Characteristics of Distributed-Feedback Resonators," Optics Express, Feb. 19, 2018, 26(4):4892-905.

Lai et al., "Distributed Bragg Reflector Fiber Laser Fabricated by Frmtosecond Laser Inscription," Optics Letters, Jun. 2006, 31(11): 3 pages.

Lee et al., "Metasurface eyepiece for augmented reality," Nature Communications, Nov. 2018, 9(1):1-10.

Li et al. "Enabling High Performance Deep Learning Networks on Embedded Systems," IECON 2017—43rd Annual Conference of the IEEE Industrial Electronics Society, Nov. 1, 2022, 6 pages.

Mauricio et al., "Design Framework for nnetasurface optics-based convolutional neural networks," Applied Optics, May 2021, 60(15):4356-4365.

Molesky et al., "Inverse design in nanophotonics," Nature Photonics, Nov. 2018, 12:659-670.

Molesky, "Outlook for inverse design in nanophotonics," CoRR, Jan. 2018, arxiv.org/abs/1801.06715, 13 pages.

News.mit.edu [Online] New system allows optical "deep learning," Jun. 12, 2017, retrieved on Oct. 9, 2018, retrieved from URL <http://news.mit.edu/2017/new-system-allows-optical-deep-learning-0612>, 3 pages.

Piggot, "Automated Design of Puotonic Devices," Dissertation for the degree of Doctor of Philosophy, Stanford University, Department of Electrical Engineering, Jun. 2018, 114 pages.

Piggott et al., "Fabrication-constrained nanophotonic inverse design," Scientific Reports, May 2017, 7(1786):1-7 pages.

Researchgate.net [online], "Optical Multiplexing and Demultiplexing," Apr. 2003, retrieved on Nov. 9, 2022, retrieved from URL<https://www.researchgate.net/publication/229479977_Optical_Multiplexing_and_Demultiplexing/link/61080e5c0c2bfa282a178420/download/>, 2 pages.

Sitzmann et al., "End-to-end Optimization of Optics and Image Processing for Achromatic Extended Depth of Field and Super-resolution Imaging," ACM Trans. Graph., Aug. 2018, 37(4):1-13.

Springer.com [Online] "Supplementary Information: Fabrication-constrained nanophotonic inverse design," May 2017, retrieved on Oct. 9, 2018, retrieved from URL <https://static-content.springer.com/esm/art%3A10.1038%2Fs41598-017-019392/MediaObjects/41598_2017_1939_MOESM2_ESM.pdf>, 10 pages.

Tahersima et al., "Deep Neural Network Inverse Design of Integrated Nanophotonic Devices," CoRR, Sep. 2018, arxiv.org/abs/1809.03555, 8 pages.

Tahersima et al., "Nanostructured Photonic Power Splitter Design via Convolutional Neural Networks," 2019 Conference on Lasers and Electro-Optics, Oct. 31, 2022, 2 pages.

Tasyurek, "Wavelength Demultiplexing Using Multilayer Structures With Frustrated Total Internal Reflection," Dissertation for the degree of Doctor of Philosophy, Stanford University, Department of Electrical Engineering, Mar. 2015, 205 pages.

Trivedi, et al., "Data-driven acceleration of photonic simulations," Scientific Reports, Dec. 23, 2019, 9:19728.

Udupa et al., "Voxelized Topology Optimization for Fabrication Compatible Inverse Design of 3D Photonic Devices," Optics Express, Jul. 2019, 27(15):21988-21998.

Wikipedia.com (Online) "Kernel (image processing)," Dec. 7, 2019, retrieved on Oct. 11, 2022, retrieved from URL«https://en.wikipedia.org/w/index.php?title=Kernel_(image_processing)&oldid=929690058», 6 pages.

Winick et al., "Design of Grating-Assisted Waveguide Couplers with Weighted Coupling," Journal of Lightwave Technology, Nov. 1991, 9(11):1481-1491.

Xu et al., "Navigating through complex photonic design space using machine learning methods," SPIE Optics + Optoelectronics, Apr. 2019, 11031:110310S-1.

Yin, "Photonic Inverse Design for 3-D Structures and Optical Phase Change Materials," Massachusetts Institute of Technology, Jun. 2019, 85 pages.

Yu et al., "Inverse-Design-based Light Via for Multi-Layer Photonic Integration Circuit," 2018 Asia Communications and Photonics Conference, 2018, 3 pages.

(56) References Cited

OTHER PUBLICATIONS

Arellano, C. "Efficient Design of Photonic Integrated Circuits" 2011 13th International Conference on Transparent Optical Networks; DOI: 10.1109/ICTON.2011.5970850 [retrieved on Mar. 4, 2024] (Year: 2011).

Callewaert, F. "Inverse-Design and Fabrication of Electromagnetic Devices" [Thesis] Field of Electrical Engineering, Northwestern University [retrieved on Mar. 12, 2022] (Year: 2018).

Chan et al. "Architectural Exploration of Chip-Scale Photonic Interconnection Network Designs Using Physical-Layer Analysis" Journal of Lightwave Technology, vol. 28, No. 9, May 1, 2010 [retrieved on Mar. 3, 2024] (Year: 2010).

Nielsen et al. "Topology Optimization of Compact E-Plane Waveguide Filters" Topology optimization and experimental verification of compact E-plane waveguide filters. Microwave and Optical Technology Letters, 61(5), 1208-1215. (Published Jan. 2019) [retrieved on Mar. 4, 2024] (Year: 2019).

Frellsen , L. "Topology Optimized Components for Mode- and Wavelength Division Multiplexing" [Thesis] Department of Photonics Engineering, Technical University of Denmark [retrieved on Mar. 4, 2024] (Year: 2016).

\* cited by examiner

MULTIMODAL PHOTONIC COMPONENTS

CROSS-REFERENCE TO RELATED APPLICATION

This application is a continuation of U.S. patent application Ser. No. 16/720,957, filed Dec. 19, 2019, which is incorporated herein by reference in its entirety.

BACKGROUND

This specification relates to designing multimodal photonic components. Operation of photonic components can be sensitive to operating conditions of the photonic component, where changes in the operating conditions, e.g., temperature fluctuation, can result in detrimental changes to the performance of the photonic component. Operation of a photonic component over a range of operating conditions is desirable, to improve robustness of the photonic component without sacrificing performance.

SUMMARY

This specification describes technologies relating to designing multimodal photonic components via inverse design such that the overall performance at an operating wavelength is robust to changes in the operating conditions of the individual component modes. The photonic components are designed such that changes in operating conditions (e.g., temperature, mechanical deformation, port alignment error, etc.) do not detrimentally affect performance of the photonic component.

In general, one innovative aspect of the subject matter described in this specification can be embodied in methods that include the actions of defining a loss function within a simulation space composed of a plurality of voxels, the simulation space encompassing the one or more features of the multimodal photonic component, the loss function corresponding to a target output mode profile for a particular input mode profile, where the target output mode profile includes a relationship between a set of operating conditions of the multimodal photonic component and the one or more supported modes of the multimodal photonic component at a particular operative wavelength of the multimodal photonic component. An initial structure is defined for the one or more features in the simulation space, at least some of the voxels corresponding to each of the features and having a dimension smaller than a smallest operative wavelength of the multimodal photonic component. Values are determined using a computer system for at least one structural parameter for each of the one or more features using a finite-difference time domain solver to solve Maxwell's equations so that a loss determined according to the loss function is within a threshold loss, where the at least one parameter corresponds to a structure of the multimodal photonic component, and a final structure is defined of the one or more features based on the values for the one or more structural parameters.

Other embodiments of this aspect include corresponding systems, apparatus, and computer programs, configured to perform the actions of the methods, encoded on computer storage devices.

These and other embodiments can each optionally include one or more of the following features. In some implementations, the set of operating conditions of the multimodal photonic component includes an operative range of temperatures for the multimodal photonic component, where there is at least one or more supported modes at each temperature of the operative range of temperature for the multimodal photonic component at the particular operative wavelength.

In some implementations, designing the multimodal photonic component includes designing the multimodal photonic component including reduced temperature sensitivity over the operative range of temperatures at the particular operative wavelength.

In some implementations, the one or more features include a substrate and a set of layers on the substrate. The multimodal photonic component can include a distributed Bragg resonator, where the distributed Bragg resonator has at least one supported mode at the particular operative wavelength for each temperature of the range of operative temperatures for the distributed Bragg resonator. The one or more features can include a set of layers of a layer structure for the distributed Bragg resonator, and the at least one structural parameter corresponds to a material composition for each layer in the set of layers of the layer structure for the distributed Bragg resonator.

In some implementations, the at least one structural parameter is a refractive index at each voxel for each of the one or more features.

Particular embodiments of the subject matter described in this specification can be implemented so as to realize one or more of the following advantages. An advantage of this technology is that the system can support multiple modes through a range of operating conditions for example, through a range of operating temperatures, thereby reducing the sensitivity of the photonic component to changes in operating conditions (e.g., reducing the need to have temperature regulation for the photonic component) and improving system performance, higher bandwidth, and stability through a range of operating conditions. By ensuring a set of modes compatible with a range of operating conditions, modal decomposition and recombination can be used to compensate for changes in the operating conditions, e.g., temperature shifts of the photonic component during operation, or temperature shifting in the atmosphere for free-space transmission. Additionally, a system supporting the extended temperature range may be more compact while still meeting performance specifications for the temperature range.

In some implementations, a passive or non-passive component can be utilized in combination with the photonic component and enable the shifting from one set of modes to a next set of modes based on the operating conditions of the photonic component such that the photonic component operates continuously over a range of operating conditions, e.g., the photonic component supports at least one mode through a range of operative temperatures. Additionally, available bandwidth of the photonic component can be fully utilized for communication purposes, e.g., for a multi-mode fiber. Tighter beam steering with minimal side lobes can result from the subject matter of this specification.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

The technology of this patent application relates to designing multimodal photonic components such that the overall performance at an operating wavelength is robust to changes in the operating characteristics of the individual component modes. The photonic components are designed such that changes in operating conditions (e.g., temperature, mechanical deformation, port alignment error, etc.) do not detrimentally affect the performance of the photonic component. The technology determines design considerations that allow for multiple different modes to be active at the same time for a given wavelength as operating conditions (e.g., temperature of device) shift such that a set of particular modes that interact with the given wavelength will change as the operating conditions (e.g., temperature and shifting refractive index of the materials) of the photonic component change. The mutual interaction between the multiple active modes with each other and respective input/output ports can achieve an overall desired performance, e.g., utilizing a full set of available modes within a communication channel for transmitting data.

More particularly, the technology uses a computational inverse design tool with forward simulation to determine how a system (e.g., a photonic component) will behave as the operating conditions (e.g., temperature) of the photonic component changes. The system can be parameterized to include/exclude design features of the photonic component (e.g., defects in a distributed Bragg reflector) to be compatible with a set of supported modes through a range of operating conditions (e.g., multiple supported modes at each temperature in the range of operating temperatures).

A supported mode can be, for example, a transverse electric (TE) mode, where the electric vector for the TE wave is perpendicular to the direction of propagation through the photonic component, or a transverse magnetic (TM) mode, where the magnetic vector for the TM wave is perpendicular to the direction of propagation through the photonic component, where the photonic component is, for example, a waveguide. In some embodiments, a supported mode is a transverse electromagnetic (TEM) mode, where both the electric and magnetic components are perpendicular to the direction of propagation through the photonic component. In some embodiments, a supported modes can be quasi-transverse electric modes and/or quasi-transverse magnetic modes. Supported modes may be hybrid modes including combinations of TE, TM, TEM, quasi-TE, and quasi-TM modes.

In one embodiment, the system is divided into voxels where a gradient of a loss function can be calculated for each voxel of the set of voxels that define the system. Each voxel can be sub-wavelength in resolution for particular wavelengths of interest. A finite-difference time domain method including multiple time-steps is modified to use tensor-flow methodology to mimic a convolutional neural network such that a solution (e.g., a gradient approximation) to the differentiable Maxwell's equations at each time-step can be found by gradient descent.

The computational inverse design tool can back-propagate a desired output mode combination and a set of operating conditions (e.g., a temperature of the photonic component) to determine a mode combination of the input that will yield the desired output mode combination.

Additionally, manufacturability (e.g., radius of curvature, spacing between features, and other design considerations) can be specified by including a loss term related to fabrication and available materials properties at each voxel in the structure. In one implementation, the inverse design tool can back propagate the optimized loss properties and then pass the resulting design for a structure through a fabrication model (e.g., manufacturability and available materials properties) such that functional designs that result from the inverse design tool are achievable based on known techniques.

In some embodiments, the photonic component is a distributed Bragg reflector (DBR) including a determined set of defects, where a resonance for a particular wavelength is aligned with a particular defect of the set of defects for a particular temperature in a range of operating temperatures, and where a set of resonances for respective temperatures can be aligned with a set of defects incorporated into the DBR design, such that there is a continuous resonance through a range of operating temperatures of the DBR.

A final structure for the multimodal photonic component is determined using a design tool, which refers to a computational engine that determines a design for the multimodal photonic component that satisfies pre-specified performance criteria. Such an approach to design is referred to as "inverse design" and the computational engine for solving such problems is referred to as an "inverse design tool."

In certain implementations, the inverse design problem involves having a designer specify the performance criteria for the multimodal photonic component in terms of a "loss function," L (also sometimes referred to a "cost function"), which represents a variation of the performance of a given design for the multimodal photonic component from the specified performance. When L is below a specified threshold, e.g., L≤0, for a given design, it signifies that the specified performance has been met. By appropriately defining the loss, the inverse problem can therefore be expressed as finding a design, z, for the multimodal photonic component which satisfies L≤0.

Inverse design problems can be solved computationally through a combination of a simulation module and a specification loss module. The simulation module is used to mathematically model a physical system incorporating a given design for the multimodal photonic component using equations that describe the physical properties of the physical system, such as Maxwell's equations. The simulation module can also mathematically account for constraints involved in manufacturing (e.g., structure sizes and shapes and material properties) and operating the device (e.g., thermal effects). The specification loss module determines the loss for a particular design, effectively evaluating the performance of the device compared to the desired performance.

Figure 1A:
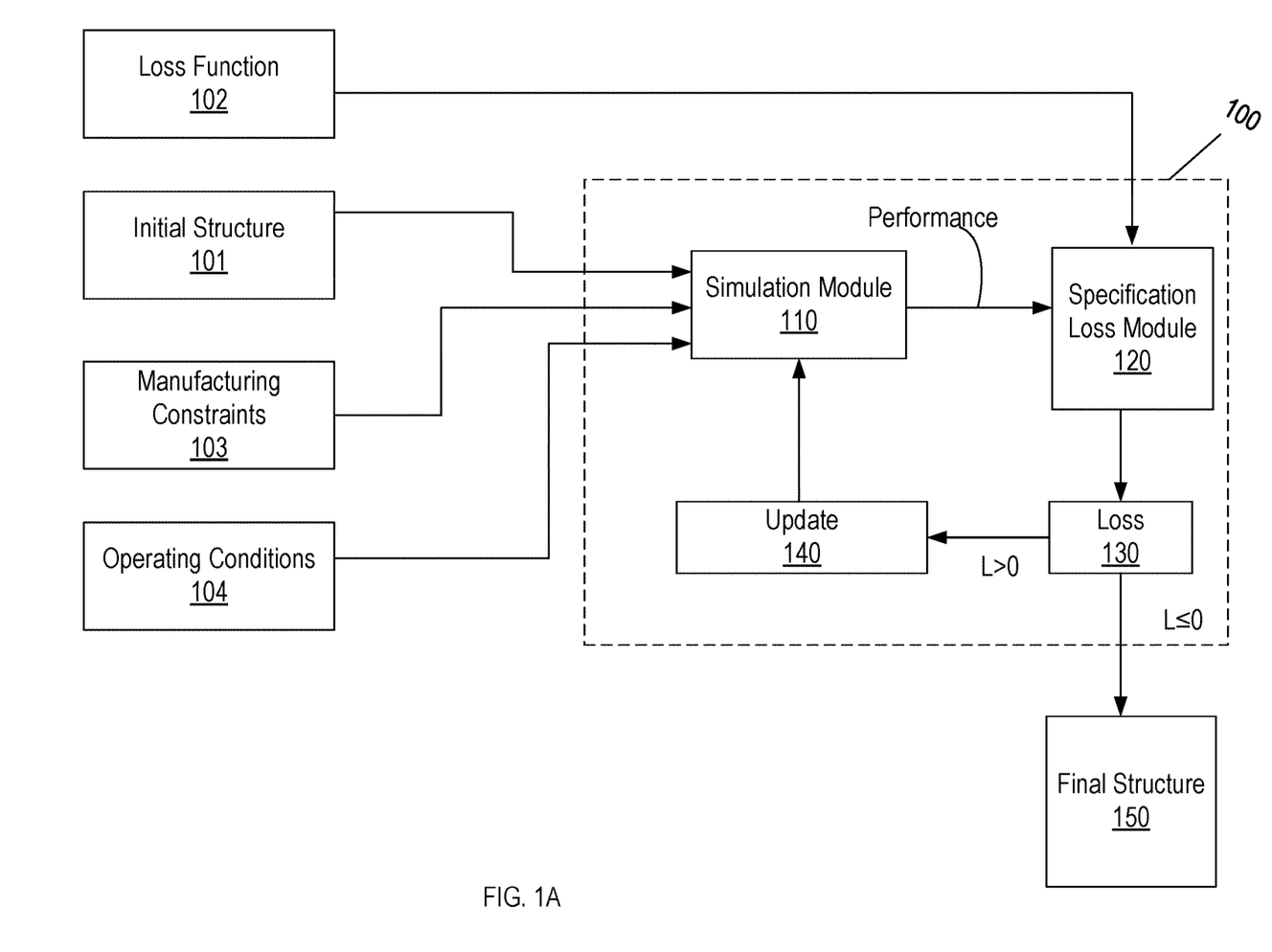
FIG. 1A is a block diagram of an example operating environment for using an inverse design tool approach to design a multimodal photonic component.

FIG. 1A is a block diagram of an example operating environment for using an inverse design tool approach to design a multimodal photonic component. FIG. 1A shows an architecture for a computational inverse design tool 100 that uses a simulation module 110 and a specification loss module 120 to iteratively simulate the performance of a multimodal photonic component and determine a loss 130 for the device. Depending on whether the loss exceeds (e.g., L>0) or meets (e.g., L≤0) a threshold value, the design tool either updates (140) a structure of the device or produces a final structure 150 for the device.

Design tool 100 uses a number of input parameters from a user in order to determine a final structure for the device. These include an initial structure 101 for the multimodal photonic component, a loss function 102, manufacturing constraints 103 and operating conditions 104.

Initial structure 101 generally includes a starting point for the composition and dimensions for the multimodal photonic component. The initial structure 101 can include, for example, a general structure for a particular type of photonic component, e.g., a waveguide, a distributed Bragg reflector, a laser cavity, a Fabry-Perot resonator, or the like. Materials can be specified for the initial structure 101, for example, III-V based materials, silicon, metals, semi-metals, or the like. In one example, an initial structure 101 can be a distributed Bragg resonator including a periodic array of layers, e.g., 35 periods of AlAs/GaAs layers. The initial structure 101 can include doped layers, e.g., n-doped GaAs. Further details for an example photonic component are discussed below with respect to FIGS. 2A-2C.

In some implementations, the initial structure 101 can specify an initial set of dimensions, e.g., layer thicknesses, periodicity, internal structures, or the like. In some embodiments, features such as trenches, pillars, quantum dots, or the like can be specified for the initial structure 101. For example, the initial structure 101 can specify layer thicknesses for respective layers of a periodic structure.

Loss function 102 is based on the desired performance of the multimodal photonic component and is typically defined by a desired electric field profile. In many cases, the desired electric field profile corresponds to an electric field output by the multimodal photonic component in response to a particular input or inputs. Loss function 102 can be defined based in part on the desired performance of the photonic component for a set of operating conditions, e.g., a range of operating temperatures. In one example, the desired performance can include at least one supported mode of a particular wavelength over a range of operating temperatures of the photonic component.

In some implementations, the electric field input is a mixture of modes and the electric field output with be another mixture of modes, such that a particular mixture of input modes results in another particular mixture of output modes for a particular operative wavelength of the multimodal photonic component.

Manufacturing constraints 103 incorporate constraints based on practical manufacturing considerations. For example, manufacturing constraints can be associated with an amount of spacing between components, size of one or more components, radius of curvature of one or more components, maximum cost of potential materials, availability of potential materials, and so forth.

In some implementations, manufacturing constraints 103 can include constraints based on the manufacturing processes available for manufacturing the photonic component. A manufacturing system can be, for example, a molecular beam epitaxy (MBE) system, a chemical vapor deposition (CVD) system, a metal-organic chemical vapor deposition (MOCVD) system, an atomic layer deposition (ALD) system, or the like. Manufacturing systems can include post-fabrication processes including contact deposition, wet or dry etching, thermal annealing, or the like. In one example, a manufacturing constraint 103 can be a range of layer thicknesses possible for a distributed Bragg reflector (DBR), e.g., a minimum possible layer thickness for a periodic layer of the DBR using an MBE system. In another example, the manufacturing constraint 103 can be a maximum number of periods of a DBR, e.g., based on growth considerations of maintaining lattice-matching growth conditions using a MBE system.

Operating conditions 104 account for other physical properties of the system, such as sources or sinks of electromagnetic fields, operating temperature, etc. In some implementations, operating conditions 104 can include mechanical deformation, port alignment error, and the like. In one example, operating conditions 104 are a range of temperatures over which the photonic component operates, where refractive indices of respective materials of the photonic component can be dependent on the operating temperature of the photonic component, e.g., the effective indices of a set of modes that are compatible with a waveguide differs based on how the modes overlap with a core of the waveguide, where the core of the waveguide and the materials surrounding the core have different refractive indices.

In another example, operating conditions 104 can be a port alignment of an optical fiber into a grating coupler, where a relative position of the optical fiber into the grating coupler determines a particular set of modes that can be launched into the grating coupler.

In yet another example, operating conditions 104 can be mechanical deformation which can affect the shape of the structure, e.g., by deforming the structure along a particular axis, change the material properties, e.g., changing the refractive index, and/or introducing coupling terms between neighboring modes, e.g., phonons forming a grating which couples a forward propagating mode to a backwards propagating mode. Mechanical deformation can be generated via overall stress induced on a chip through mechanical flexing or arising from temperature shifts, e.g., due to materials deposited on the chip having different thermal expansion coefficients. Mechanical deformations can be incorporated as an aspect of the chip design, for example, in the form of phononic mode, e.g., high-frequency mechanical vibrations, or MEMS-type components, e.g., suspended membranes that can be mechanically-actuated.

In yet another example, operating conditions 104 can be a mechanical deformation of an optical fiber, where a shape of the optical fiber (e.g., by stretching along an axis, pinching along an axis, or the like) can affect material properties such as refractive index, and/or introduce coupling terms between neighboring modes, e.g., phonons forming a grating which couples a forward propagating mode to a backwards propagating mode.

Figure 1B:
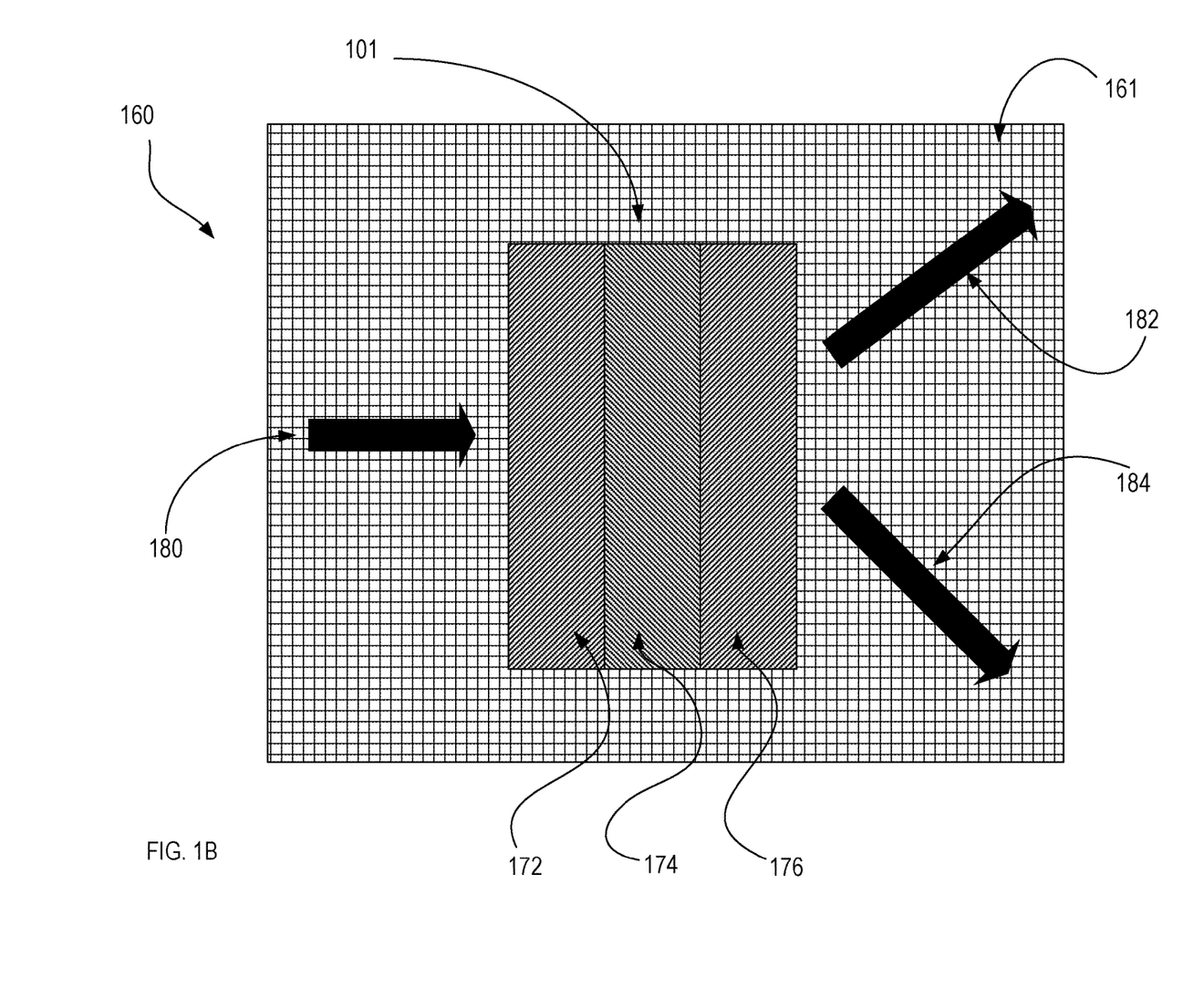
FIG. 1B shows an example layout of a multimodal photonic component represented in an inverse design tool environment.

FIG. 1B shows an example layout of a multimodal photonic component represented in an inverse design tool environment. Referring also to FIG. 1B, generally, initial structure 101 of the multimodal photonic component is defined within a simulation space 160 composed of voxels 161. Voxels are three-dimensional volume elements at which physical properties (e.g., refractive index, field values, and temperature) can be defined and/or calculated. Voxels also represent the atomic resolution of the system which is the smallest volume at which the structure of the multimodal photonic component can be computationally defined and manipulated. Each voxel 161 can be sub-wavelength (e.g., 0.5λ or less, 0.2λ or less, 0.1λ or less, 0.05λ or less) for a particular wavelength of interest in at least one dimension. In many cases, voxels are sub-wavelength in three dimensions.

As illustrated, initial structure 101 is composed of three regions 172, 174, and 176 each composed of a different material. Each extends across multiple voxels. In some implementations, each of the three regions 172, 174, and 176 can each represent a respective layer of the multimodal photonic component, e.g., a respective layer of a DBR.

Arrow 180 represents an input electromagnetic field incident on one side of initial structure 101. This field is a component of operating conditions 104, input into the simulation module. Arrows 182 and 184 represent the desired performance (e.g., the desired electromagnetic field profile output by the multimodal photonic component in response to the input electromagnetic field) of the multimodal photonic component and the loss can be established as a difference, on a voxel by voxel basis, between the electromagnetic field corresponding to these arrows and the electromagnetic field that results from the interaction between the input electromagnetic field and initial structure 101.

In some implementations, arrow 180 is an input electromagnetic field including a set of supported modes that is coupled into one side of the initial structure 101, and arrows 182 and 184 are output electromagnetic field including a set of supported modes that are output from multimodal photonic component in response to the input electromagnetic field.

Referring again to FIG. 1A, simulation module 110 determines the performance of the multimodal photonic component using a differentiable solver for Maxwell's equations to model electromagnetic fields resulting from the one or more sources interacting with the structure defined for the multimodal photonic component. In one form, Maxwell's equations can be expressed as:

$$\frac{\partial H}{\partial t} = -\frac{1}{\mu}(\nabla \times E - M_{source}); \text{ and}$$

$$\frac{\partial E}{\partial t} = \frac{1}{\epsilon}(\nabla \times H - J_{source}),$$

where E and H represent electric and magnetic fields, $\epsilon$ and $\mu$ represent permittivity and permeability of the material at each voxel, and $J_{source}$ and $M_{source}$ are electric and magnetic currents. Numerical solution of Maxwell's equations yields electric and magnetic field values at each voxel, from which design tool 100 can calculate loss 130 for each voxel using specification loss module 120.

In some embodiments, a finite difference time domain (FDTD) approach is used to solve Maxwell's equations. Details of such an approach can be found, for example, in *Computational Electrodynamics: the Finite-Difference Time-Domain Method*, Third Edition, by A. Taflove and S. C. Hagness (Artech House, 2005). Such an approach involves updating values of the electric and magnetic fields at each voxel through a series of incremental time steps. Mathematically, this update operation can be expressed by a function, where $$x_{i+1} = \phi(x_i, b_i, z)$$

for i=1, . . . , n. Here, n is the total number of time steps for the simulation, $x_i$ refers to the electric and magnetic fields at time step i, $b_i$ represents electric and magnetic sources at time step i, and z is a structural variable, corresponding to the topology of the multimodal photonic component. Additionally, the loss operation can be expressed as L= $f(x_1, \ldots, x_n)$ and takes as input all the computed fields and produces a single, real-valued scalar that can be minimized.

In such implementations, inverse design tool 100 can optimize a structure for the multimodal photonic component (i.e., final structure 150 in FIG. 1A) based on a structural gradient, dL/dz according to the formalism above. This structural gradient can be determined according to the relationship:

$$\frac{dL}{dz} = \sum_i \frac{dL}{dx_i} \frac{\partial x_i}{\partial z}.$$

The above calculations can be performed using a convolutional neural network formalism wherein the matrices representing the FDTD set of equations are sparsely populated such that the calculations can be efficiently performed using one or more tensor processing units.

Figure 2A:
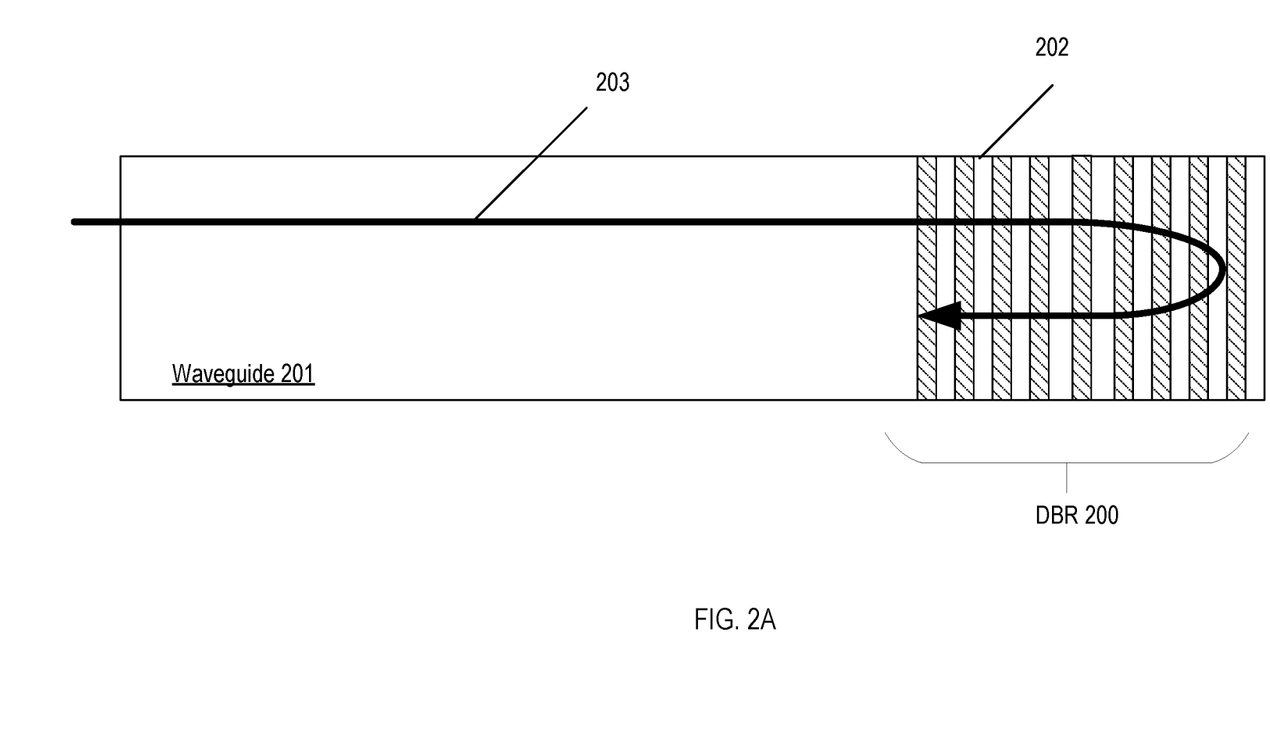
FIG. 2A shows an example layout of an initial structure of a distributed Bragg resonator.

In one embodiment, a multimodal photonic component is a distributed Bragg resonator (DBR) that is designed using the inverse design tool 100 to have at least one supported mode at a particular wavelength, over a range of operating conditions for a particular wavelength. FIG. 2A shows an example layout of an initial structure for a DBR 200.

A distributed Bragg resonator (DBR) 200 or distributed Bragg reflector resonator can be a component of a photonic component, e.g., a waveguide 201. The DBR 200 includes a set of periodic layers 202 of alternating materials with varying refractive index, or by periodic variation of some characteristic (such as height) within a dielectric waveguide 201, resulting in periodic variation in the effective refractive index in the waveguide. Each layer boundary causes a partial reflection of an optical wave. The performance of a DBR 200, e.g., the resonance of the DBR 200 can change with temperature, such that different modes are active for a particular wavelength as the temperature shifts in the photonic component 201. The effective indices of the supported modes can differ based in part on how each respective mode overlaps with the DBR 200 of the waveguide 201, where the effective indices can monotonically increase with temperature.

DBR 200 can support a set of one or more modes 203, e.g., TE modes, TM modes, TEM modes, or a combination thereof. Modes 203 can include a fundamental mode, e.g., $TE_{00}$, and/or higher order modes. Modes 203 are supported by the DBR 200 based in part on the composition and periodicity of periodic array 202 of layers of the DBR 200, and dimensions of the waveguide 201.

A DBR 200 can be designed to reflect a particular wavelength or set of wavelengths, such that the particular wavelength(s) experience reflections off of the set of periodic layers 202. A DBR 200 can be a component of a photonic component 201 including a gain medium between two DBRs 200 such that the particular wavelength(s) make multiple roundtrips through the gain medium as they are reflected off of each set of periodic layers, e.g., in a distributed Bragg reflector laser.

As applied to using the inverse design tool 100 described above with reference to FIGS. 1A and 1B, DBR 200 including periodic layers 202 can be provided as an initial structure 101 to the inverse design tool 100 with a loss function 102 that defines at least one supported mode 203 at each temperature for a range of operative temperatures at a particular wavelength, e.g., such that the effective index of the combined modes versus temperature are within a threshold stability over an operative temperature range. For example, the loss function 102 can be defined such that a different set of input modes 180 is coupled into the DBR 200 depending on the temperature of the DBR 200.

In some implementations, loss function 102 includes a set of desired output modes 182, 184 to be output from the photonic component 201, where the set of input modes 180 to the photonic component 201 including DBR 200 at a particular temperature for a range of operative temperatures can be combined, e.g., using modal decomposition and recombination, to yield the set of output modes 182, 184. In one example, two different temperatures of the range of operative temperatures of the DBR 200 each has a different set of supported modes, but that each of the two sets of supported modes can be combined to yield the set of output modes 182, 184.

Figure 2B:
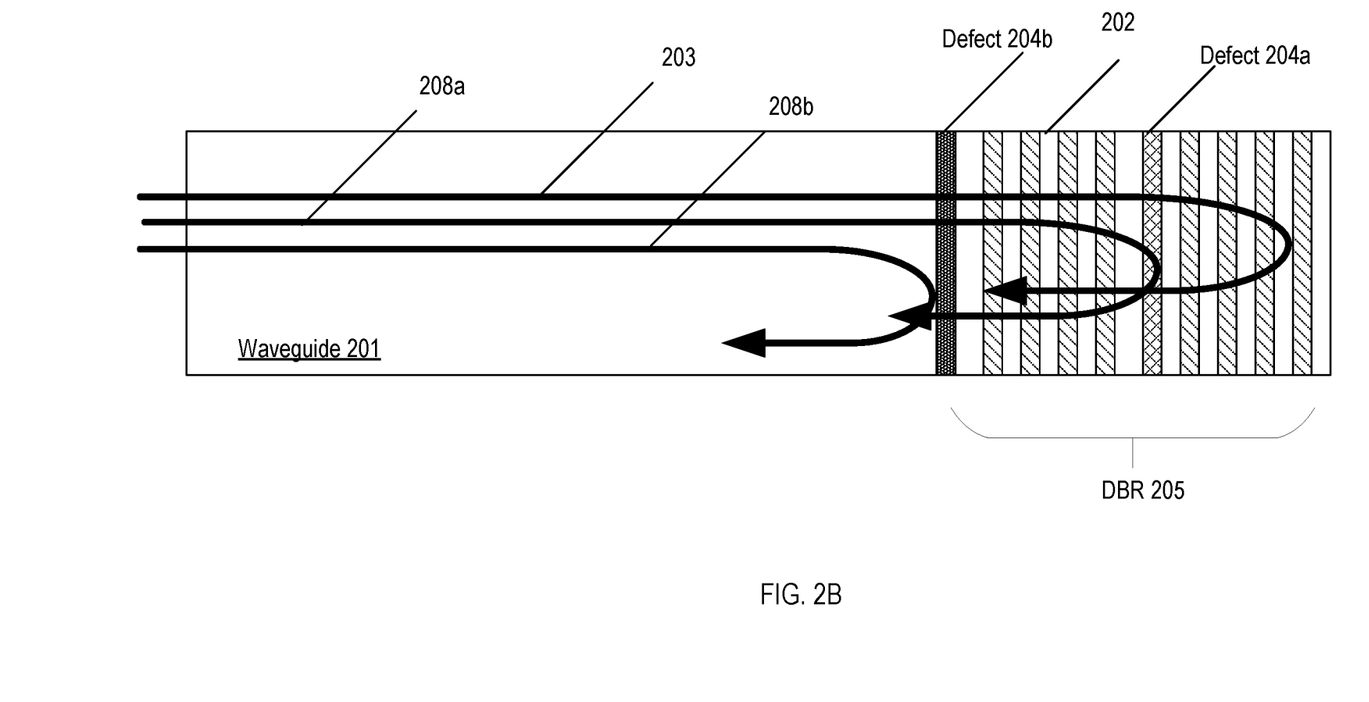
FIG. 2B shows an example layout of a final structure of a distributed Bragg resonator.

Referring now to FIG. 2B, in some implementations, the inverse design tool can be used to determine, from an initial structure DBR 200, a final structure 205 (e.g., final structure 150) including one or more defects 204a, 204b that are included in the DBR 205 having periodic array 202. Defects 204a, 204b in the DBR 205 can be, for example, a layer of material composition that is disruptive to the periodicity of the DBR layer structure. Disruptive layers can be, for example, layers whose refractive indices can be tuned electrically, or layers which respond to the fields with gain or nonlinearity.

In some implementations, a DBR defect 204a, 204b can be another form of non-periodic defect layer, for example, a layer that is of a different size (e.g., different thickness), or a layer that is of a material composition that reacts differently to the operating conditions.

Figure 2C:
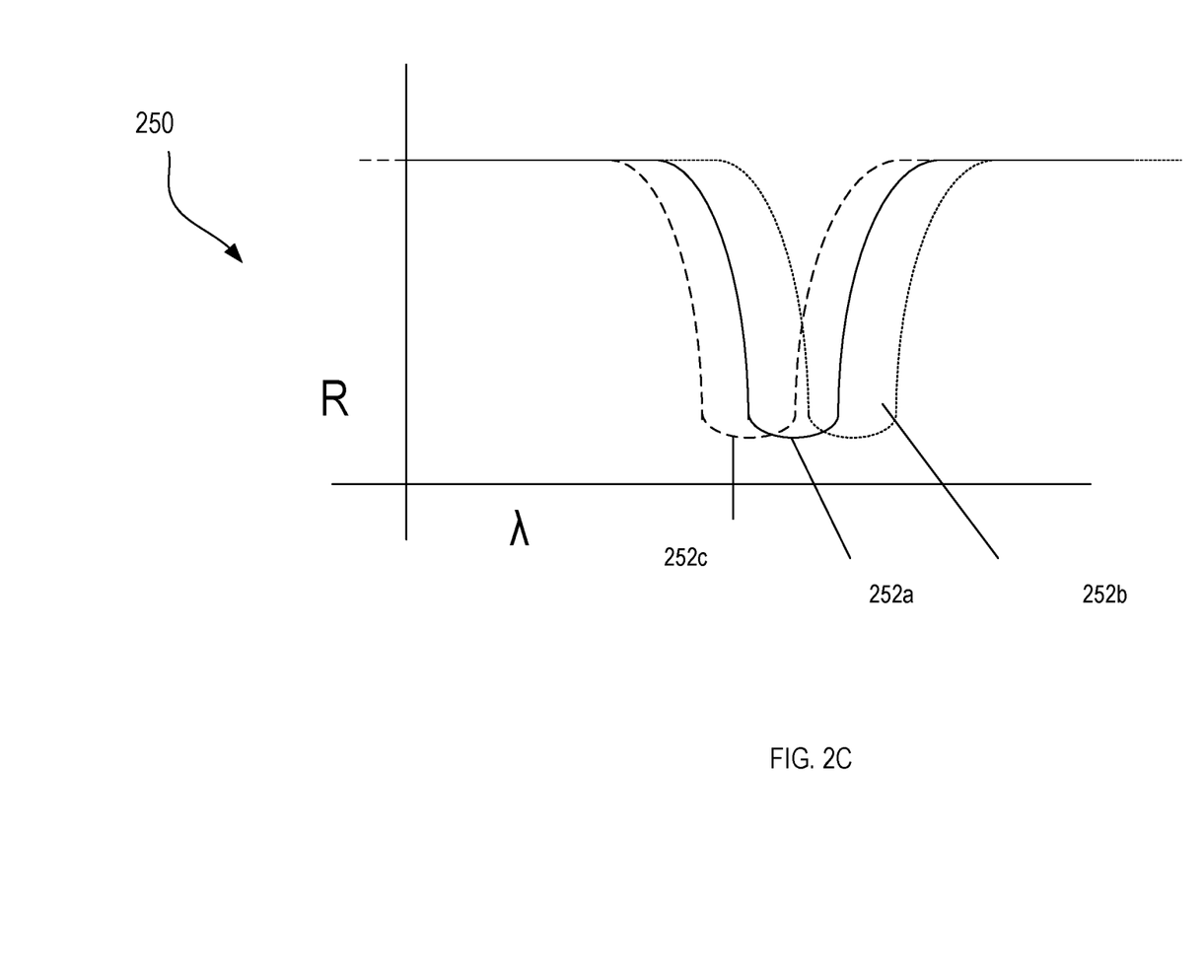
FIG. 2C shows an example plot of reflectivity of the distributed Bragg resonator versus wavelength.

Each defect 204a, 204b of the one or more defects can introduce a different reflectivity profile, where each defect can be selected, using inverse design tool 100, to have a reflectivity profile that is off-set from the reflectivity profile of the defect-free DBR, (e.g., as described in more detail with respect to FIG. 2C). In some implementations, a loss function (e.g., loss function 102) can be defined such that, for a particular wavelength of the DBR 205, at least one mode is supported by the DBR 205 at each temperature of the operative temperature range of the DBR 205.

In one embodiment, as depicted in FIG. 2B, multiple modes 203, 208a and 208b are supported by the final structure DBR 205, where defect 204a corresponds to a supported mode 208a, defect 204b corresponds to a supported mode 208b, and the periodic layers 202 of the DBR 205 correspond to supported mode 203. In some implementations, as depicted in FIG. 2B, each defect 204a, 204b can have a different set of supported modes 208a, 208b. As operating conditions, e.g., operative temperature, of the DBR 205 changes, the resonances of the DBR 205 can change due, in part, to changes in refractive indices of the layers of the DBR 205, such that different modes are active for the particular operative wavelength of the DBR 205.

Referring now to FIG. 2C, plot 250 shows an example of the reflectivity spectrum of the distributed Bragg resonator versus wavelength for DBR 205 including defects 204a and 204b. Plot 250 depicts multiple valleys, 252a, 252b, and 252c, each resulting from a respective resonance in the DBR 250 due to the periodic array 202, defect 204a, and defect 204b, respectively. At a particular set of operating conditions (e.g., operating conditions 104) a set of input supported modes (e.g., modes 203, 208a, 208b) that overlaps with a particular valley 252a, 252b, or 252c can be selected for the particular set of operating conditions.

In some implementations, a passive component or non-passive component can be used to enable the shifting from one set of input supported modes to a different set of supported modes to the next based on the set of operating conditions of the DBR 205.

Figure 3:
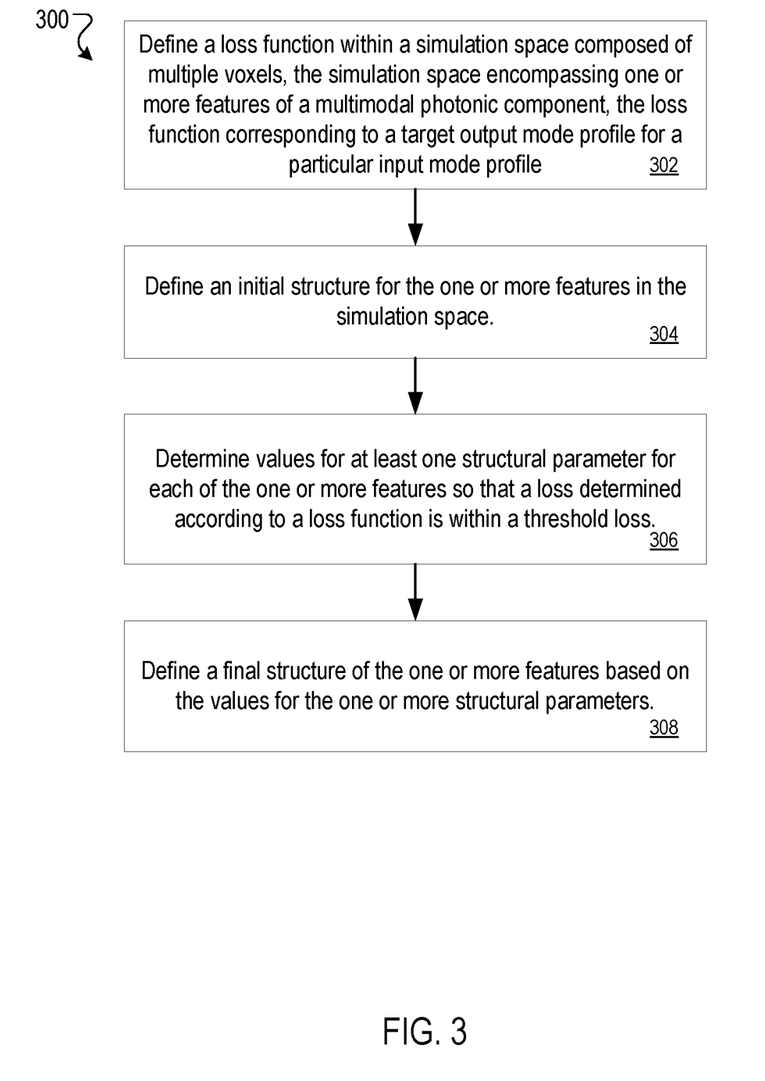
FIG. 3 is a flow diagram of an example process for designing a multimodal photonic component.

FIG. 3 is a flow diagram of an example process for designing a multimodal photonic component. In some implementations, designing the multimodal photonic component includes designing the multimodal photonic component having reduced temperature sensitivity over the operative range of temperatures at a particular operative wavelength. For example, designing a waveguide including a distributed Bragg reflector that can operate, e.g., support at least one mode, at each operating temperature for a range of temperatures for a particular wavelength.

A loss function is defined within a simulation space composed of multiple voxels, where the simulation space encompasses one or more features of a multimodal photonic component, and where the loss function corresponds to a target output mode profile for a particular input mode profile (302). The one or more features of the multimodal photonic component can be, for example, a layer structure for the photonic component including a set of layers and a substrate.

In some implementations, the target output mode profile includes a relationship between a set of operating conditions of the multimodal photonic component and the one or more supported modes of the multimodal photonic component at a particular operative wavelength of the multimodal photonic component. The supported modes of the multimodal photonic component can change based in part on the operating conditions of the multimodal photonic component, where one set of supported modes at a particular set of operating conditions is not supported at a different set of operating conditions.

In one embodiment, the set of operating conditions of the multimodal photonic component includes an operative range of temperatures for the multimodal photonic component. For example, as the temperature of the multimodal photonic component changes, the respective refractive indices of the materials of the multimodal photonic component also changes, e.g., monotonically increasing with temperature.

An initial structure is defined for the one or more features in the simulation space (304). The initial structure (e.g., initial structure 101) can include a layer structure for a multimodal photonic component, e.g., a waveguide including a distributed Bragg reflector.

The simulation space can include manufacturing constraints 103 and operating conditions 104, as described above with respect to FIGS. 1A-B. At least some of the voxels of the multiple of voxels defined within the simulation space can correspond to each of the features and have a dimension smaller than a smallest operative wavelength of the multimodal photonic component. For example, at least some voxels of the multiple voxels within the simulation space correspond to each layer of a periodic array of layers of a DBR, where each voxel has a dimension that is smaller than, e.g., $0.5\lambda$, an operating wavelength 2 of the DBR.

A loss function 102 can be defined as an input to a simulation module 110 of an inverse design tool 100, where the loss function 102 can include at least one or more supported modes at each temperature of the operative range of temperature for the multimodal photonic component at a particular operative wavelength.

Values are determined for at least one structural parameter for each of the one or more features so that a loss determined according to a loss function is within a threshold loss (306). The structural parameter for each feature can be defined as, for example, the refractive index at each voxel for each of the one or more features. In one example, the one or more features correspond to a layer structure including a periodic array of layers for a distributed Bragg reflector (DBR) that is a part of a waveguide, and the at least one structural parameter corresponds to a material composition for each layer in the set of layers of the layer structure for the distributed Bragg resonator. Values can be determined for the at least one structural parameter using inverse design tool 100, as described in more detail above with reference to FIG. 1A-B.

A final structure is defined by the one or more features based on the values for the one or more structural parameters (308). The final structure, e.g., a final layer structure for a particular multimodal component, can be determined when a loss 130 is less than a loss criteria, e.g., $L \leq 0$. The final structure can include one or more features (e.g., layers of the photonic component) based on the structural parameters (e.g., material composition, refractive index, etc.) of each respective feature. In one example, a final structure for a DBR can include one or more defects, e.g., periodicity-disruptive layers, in addition to a periodic array of the DBR.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

In some aspects, implementations described in the present disclosure may rely on machine learning engines and machine learning algorithms to perform generative design tasks. Generative design may, in some aspects, mimic an evolutionary problem-solving process, which uses inputs such as design goals, computes hundreds (if not thousands or millions) of potential solutions, and selects one or more best solutions from the multitude of solution permutations. Indeed, in some aspects, machine learning engines applied to a generative design process may generate or process thousands-or even millions-of design choices, test configurations and learn from each iterative solution. Thus, aspects of the described implementations may use the machine learning engines in a generative design process to generate unique and bespoke solutions beyond those that a human being, alone, could create, to arrive at the best design solution. In some aspects, the machine learning engines and algorithms of the generative design process may rely on algorithmic and parametric modeling within a process that includes a design schema, one or more machine learning engines configured to create variations, and one or more machine learning engines configured to select desirable outcomes.

Figure 4:
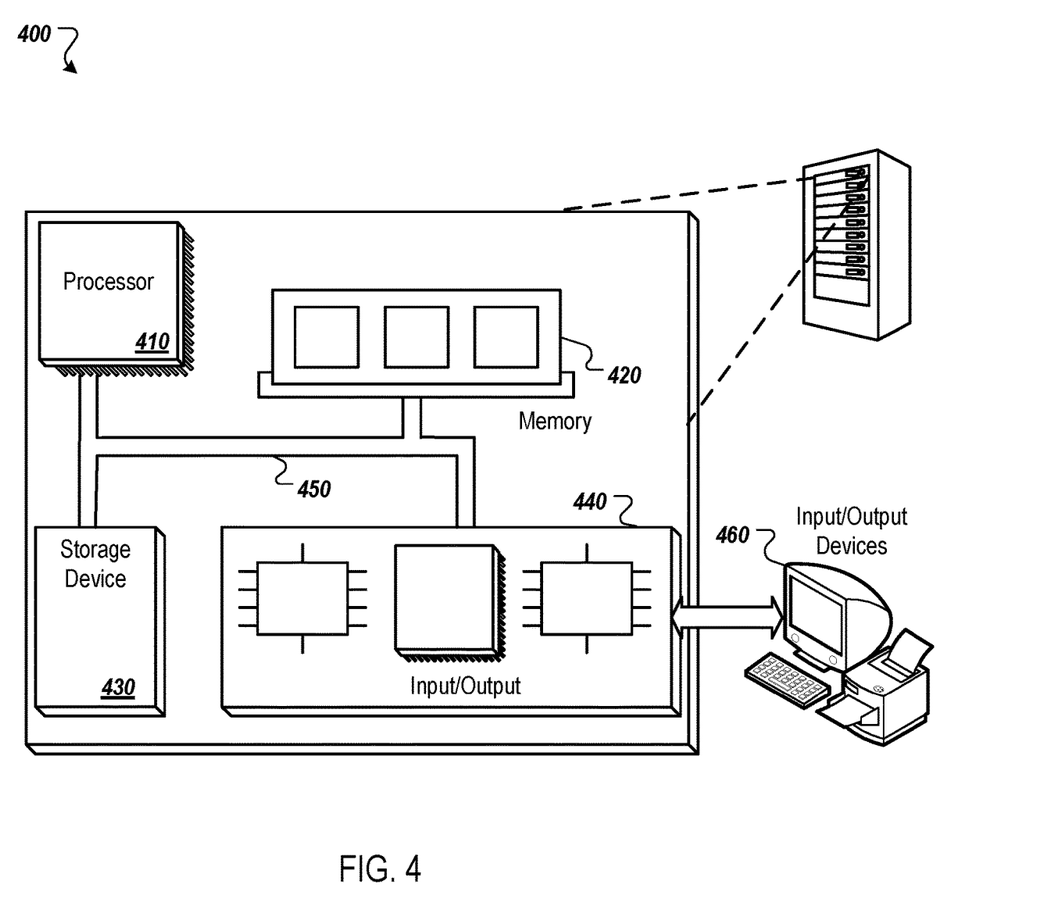
FIG. 4 is a schematic diagram of an example computer system.

FIG. 4 is a schematic diagram of an example computer system 400. The system 400 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 400 is intended to include various forms of digital computers, such as laptops, desktops, workstations, personal digital assistants, servers, blade servers, mainframes, and other appropriate computers, including vehicles installed on base units or pod units of modular vehicles. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device 460. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for designing a multimodal photonic component comprising one or more features, the method comprising:

defining a loss function within a simulation space composed of a plurality of voxels, the simulation space encompassing the one or more features of the multimodal photonic component, the loss function corresponding to a target output mode profile for a particular input mode profile, wherein the target output mode profile comprises a relationship between a set of operating conditions of the multimodal photonic component and one or more supported modes of the multimodal photonic component at a particular operative wavelength of the multimodal photonic component, wherein mode wavelengths of the target output mode profile differ from mode wavelengths particular input mode profile based on a temperature change in the photonic component, and wherein the loss function defines a plurality of structural parameters comprising a defect layer material, a number of defect layers, a waveguide material, a first reflectivity of the defect layer material, and a second reflectivity of the waveguide material that is different from the first reflectivity;

defining an initial structure for the one or more features in the simulation space, at least some of the voxels corresponding to each of the features and having a dimension smaller than a smallest operative wavelength of the multimodal photonic component;

determining, using a computer system, values for the plurality of structural parameters for each of the one or more features using a finite-difference time domain solver to solve Maxwell's equations so that a loss determined according to the loss function is within a threshold loss, wherein the plurality of structural parameters correspond to a distributed Bragg reflector structure of the multimodal photonic component; and defining a final structure of the one or more features based on the values for the plurality of structural parameters.

2. The method of claim 1, wherein the set of operating conditions of the multimodal photonic component includes an operative range of temperatures for the multimodal photonic component.

3. The method of claim 2, wherein there is at least one or more supported modes at each temperature of the operative range of temperature for the multimodal photonic component at the particular operative wavelength.

4. The method of claim 3, wherein designing the multimodal photonic component comprises designing the multimodal photonic component including reduced temperature sensitivity over the operative range of temperatures at the particular operative wavelength.

5. The method of claim 1, wherein the one or more features include a substrate and a set of layers on the substrate.

6. The method of claim 5, wherein the distributed Bragg reflector has at least one supported mode at the particular operative wavelength for each temperature of a range of operative temperatures for the distributed Bragg reflector.

7. The method of claim 1, wherein the plurality of structural parameters comprise a refractive index at each voxel for each of the one or more features.

8. A system, comprising:
one or more processors; and
a computer-readable storage device coupled to the one or more processors and having instructions stored thereon which, when executed by the one or more processors, cause the one or more processors to perform operations for designing a multimodal photonic component comprising one or more features, the operations comprising:
defining a loss function within a simulation space composed of a plurality of voxels, the simulation space encompassing the one or more features of the multimodal photonic component, the loss function corresponding to a target output mode profile for a particular input mode profile, wherein the target output mode profile comprises a relationship between a set of operating conditions of the multimodal photonic component and one or more supported modes of the multimodal photonic component at a particular operative wavelength of the multimodal photonic component,
wherein mode wavelengths of the target output mode profile differ from mode wavelengths particular input mode profile based on a temperature change in the photonic component, and
wherein the loss function defines a plurality of structural parameters comprising a defect layer material, a number of defect layers, a waveguide material, a first reflectivity of the defect layer material, and a second reflectivity of the waveguide material that is different from the first reflectivity;
defining an initial structure for the one or more features in the simulation space, at least some of the voxels corresponding to each of the features and having a dimension smaller than a smallest operative wavelength of the multimodal photonic component;
determining, using a computer system, values for the plurality of structural parameters for each of the one or more features using a finite-difference time domain solver to solve Maxwell's equations so that a loss determined according to the loss function is within a threshold loss, wherein the plurality of structural parameters correspond to a distributed Bragg reflector structure of the multimodal photonic component; and
defining a final structure of the one or more features based on the values for the plurality of structural parameters.

9. The system of claim 8, wherein the set of operating conditions of the multimodal photonic component includes an operative range of temperatures for the multimodal photonic component.

10. The system of claim 9, wherein there is at least one or more supported modes at each temperature of the operative range of temperature for the multimodal photonic component at the particular operative wavelength.

11. The system of claim 10, wherein designing the multimodal photonic component comprises designing the multimodal photonic component including reduced temperature sensitivity over the operative range of temperatures at the particular operative wavelength.

12. The system of claim 8, wherein the one or more features include a substrate and a set of layers on the substrate.

13. The system of claim 12, wherein the distributed Bragg reflector has at least one supported mode at the particular operative wavelength for each temperature of a range of operative temperatures for the distributed Bragg reflector.

14. The system of claim 8, wherein the plurality of structural parameters comprise a refractive index at each voxel for each of the one or more features.

15. One or more non-transitory computer-readable storage media coupled to one or more processors and having instructions stored thereon which, when executed by the one or more processors, cause the one or more processors to perform operations for designing a multimodal photonic component comprising one or more features, the operations comprising:
defining a loss function within a simulation space composed of a plurality of voxels, the simulation space encompassing the one or more features of the multimodal photonic component, the loss function corresponding to a target output mode profile for a particular input mode profile, wherein the target output mode profile comprises a relationship between a set of operating conditions of the multimodal photonic component and one or more supported modes of the multimodal photonic component at a particular operative wavelength of the multimodal photonic component,
wherein mode wavelengths of the target output mode profile differ from mode wavelengths particular input mode profile based on a temperature change in the photonic component, and
wherein the loss function defines a plurality of structural parameters comprising a defect layer material, a number of defect layers, a waveguide material, a first reflectivity of the defect layer material, and a second reflectivity of the waveguide material that is different from the first reflectivity;
defining an initial structure for the one or more features in the simulation space, at least some of the voxels corresponding to each of the features and having a dimension smaller than a smallest operative wavelength of the multimodal photonic component;
determining, using a computer system, values for the plurality of structural parameter for each of the one or more features using a finite-difference time domain solver to solve Maxwell's equations so that a loss determined according to the loss function is within a threshold loss, wherein the plurality of structural parameter corresponds to a distributed Bragg reflector structure of the multimodal photonic component; and defining a final structure of the one or more features based on the values for the plurality of structural parameters.

16. The computer-readable storage media of claim 15, wherein the set of operating conditions of the multimodal photonic component includes an operative range of temperatures for the multimodal photonic component.

17. The computer-readable storage media of claim 16, wherein there is at least one or more supported modes at each temperature of the operative range of temperature for the multimodal photonic component at the particular operative wavelength.

18. The computer-readable storage media of claim 17, wherein designing the multimodal photonic component comprises designing the multimodal photonic component including reduced temperature sensitivity over the operative range of temperatures at the particular operative wavelength.

\* \* \* \* \*